United States Patent
Jones et al.

(10) Patent No.: US 11,770,257 B1
(45) Date of Patent: Sep. 26, 2023

(54) BLOCKCHAIN INCORPORATED SYSTEM FOR VERIFYING INGREDIENTS IN AGRICULTURAL PRODUCTS AND BYPRODUCTS

(71) Applicant: Research Blocks Technologies, Inc., Tampa, FL (US)

(72) Inventors: Christopher Jones, Tampa, FL (US); Justin Kim, Gainesville, FL (US)

(73) Assignee: Research Blocks Technologies, Inc., Tampa, FL (US)

( * ) Notice: Subject to any disclaimer, the term of this patent is extended or adjusted under 35 U.S.C. 154(b) by 235 days.

(21) Appl. No.: 16/784,310

(22) Filed: Feb. 7, 2020

(51) Int. Cl.
*G06F 21/00* (2013.01)
*H04L 9/32* (2006.01)
*G06K 7/14* (2006.01)
*H04L 9/00* (2022.01)

(52) U.S. Cl.
CPC .......... *H04L 9/3239* (2013.01); *G06K 7/1417* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,467,586 B2* | 11/2019 | Fuller | ................... | H04L 9/3236 |
| 10,896,427 B2* | 1/2021 | Grinberg | ................ | G06Q 30/08 |
| 11,207,584 B2* | 12/2021 | Tran | ........................ | G06F 3/017 |
| 11,216,448 B2* | 1/2022 | Brody | ..................... | H04L 9/088 |
| 11,216,841 B1* | 1/2022 | Andersen | ................ | G06Q 30/00 |
| 2009/0132395 A1* | 5/2009 | Lam | ...................... | G06F 16/9535 |
| | | | | 705/30 |
| 2014/0242228 A1* | 8/2014 | Nadeau | ................. | A23K 20/174 |
| | | | | 426/641 |
| 2014/0252077 A1* | 9/2014 | Corby | ...................... | G06K 5/00 |
| | | | | 235/375 |
| 2016/0098723 A1* | 4/2016 | Feeney | ................ | G06Q 20/065 |
| | | | | 705/75 |
| 2016/0203352 A1* | 7/2016 | Marsico | ............... | G06K 7/1417 |
| | | | | 235/375 |
| 2016/0321677 A1* | 11/2016 | Dobaj | ................ | G06Q 30/0185 |
| 2017/0067556 A1* | 3/2017 | Sailer | ..................... | B01F 35/212 |
| 2017/0262862 A1* | 9/2017 | Aljawhari | ............. | G06F 16/242 |
| 2018/0096175 A1* | 4/2018 | Schmeling | ............. | G06Q 10/08 |
| 2018/0117446 A1* | 5/2018 | Tran | ..................... | A42B 3/0433 |
| 2018/0174094 A1* | 6/2018 | Ren | ........................ | G06Q 10/087 |
| 2018/0276600 A1* | 9/2018 | Fuller | .................... | H04L 9/3236 |
| 2019/0158470 A1* | 5/2019 | Wright | .................. | G06F 21/602 |
| 2019/0188732 A1* | 6/2019 | Hill | ..................... | G06Q 30/0185 |

(Continued)

*Primary Examiner* — Andrew J Steinle
*Assistant Examiner* — Hassan A Hussein

(57) ABSTRACT

A method verifies the ingredients in an agricultural product or byproduct. Data packages related to compound purity are uploaded and assigned a hash within a blockchain directory. These compounds are combined according to a formula in order to create batches of a product. The formula is tracked through the system and the batches become tied to the data packages associated with the compounds found within the batch. The data packages associated with the compounds within the formula can be accessed by merchants or consumers who wish to verify the ingredients contained in the batch. This method collects data to assist with supply chain management while assuring the quality of products delivered to consumers.

16 Claims, 3 Drawing Sheets

(56) References Cited

U.S. PATENT DOCUMENTS

| | | | | |
|---|---|---|---|---|
| 2019/0207749 A1* | 7/2019 | McKellar | .............. | G06F 21/64 |
| 2019/0228039 A1* | 7/2019 | Doble | .............. | G06Q 50/12 |
| 2019/0236527 A1* | 8/2019 | Bhaumik | .............. | G06Q 10/087 |
| 2019/0258991 A1* | 8/2019 | Nguyen | .............. | G06F 16/182 |
| 2019/0272908 A1* | 9/2019 | Hill | .............. | H04L 9/0643 |
| 2019/0373414 A1* | 12/2019 | Kaufman | .............. | G08G 1/205 |
| 2020/0159720 A1* | 5/2020 | Leong | .............. | G06Q 50/10 |
| 2020/0334921 A1* | 10/2020 | Spes | .............. | G06F 17/18 |
| 2020/0407092 A1* | 12/2020 | Bast | .............. | B65B 41/00 |
| 2021/0019760 A1* | 1/2021 | Bast | .............. | G06F 16/27 |
| 2021/0272184 A1* | 9/2021 | Passy | .............. | H04L 63/123 |
| 2021/0310037 A1* | 10/2021 | Narula | .............. | G01N 33/02 |
| 2021/0382026 A1* | 12/2021 | Narula | .............. | C12Q 1/04 |

* cited by examiner

BLOCKCHAIN INCORPORATED SYSTEM FOR VERIFYING INGREDIENTS IN AGRICULTURAL PRODUCTS AND BYPRODUCTS

BACKGROUND

Certain substances, while widely available to the public, are not reviewed or regulated by Federal agencies. Many vitamins, supplements or other agricultural byproducts are widely distributed without any reliable system of tracking. Whether distributed by national chains or local businesses, studies have shown that unregulated substances can be contaminated by germs, pesticides, or heavy metals. Chemical processes such as extraction, suspension and isolation may leave behind contaminants in solid and liquid products. Current verification methods are expensive and decentralized. These solutions are insufficient to effectively monitor the market. Manufacturers must voluntarily take an extra step to apply for the verification process after their products have already been manufactured. Verification reports are also not shared directly with consumers and are not available from a single source.

SUMMARY

An example method for verifying the content and quality of a compound or multiple compounds used in a specific batch of a finished agricultural product or byproduct includes the following. A blockchain directory is used to generate hashes and store data packages according to those hashes. This network directory includes verified researchers and is constantly updated by manufacturers who can easily incorporate the verification step to the manufacturing process and directly share the verification reports with consumers. When compounds are verified, the compounds then are combined according to formulas into batches of finished products (e.g., finished agricultural products or byproducts). An additional step of applying for verification is no longer required for the more complex batched finished products and the cost for verification is significantly reduced. Manufacturers also gain the ability to internally track and audit the manufacturing process through the use of this method.

Compounds can be verified for purity prior to being sold to manufacturers or once the compounds are purchased and received by the manufacturers, but before being combined in a formula. When a formula is applied, the data packages and reports associated with a compound hash are tied to an identifier for each batch of finished products. That identifier can then be used by consumers or secondary merchants to retrieve reports from the system. These users can access a report for the individual batch of finished products, verifying the purity and quality of each individual compound included in the batch of finished products, through use of a single point of access to the system. The manufacturer is able to provide the batch identifier to merchants prior to shipping the finished products so that merchants can be sure of what they are purchasing. Manufacturers that sell directly to consumers can place the identifier on products in a store or in e-commerce which allows consumers to make more educated decisions as to which finished products they purchase.

By incorporating a blockchain directory, the example system allows for the gathering of data. The directory, while providing verification data for each individual finished product batch, also provides a means for gathering supply chain information. Since every compound, formula, and finished product batch is tracked through the system, trend data can be gathered. These data may be of value to manufacturers as the manufacturers can track trends and predict their future needs with a greater degree of accuracy. The directory also may assist businesses that sell compounds in properly assessing the market's demand for the businesses' merchandise and more efficiently allocate the businesses' resources.

DESCRIPTION OF THE DRAWINGS

The DETAILED DESCRIPTION refers to the following Figures, in which like numerals refer to like items, and in which.

DETAILED DESCRIPTION

Figure 1:
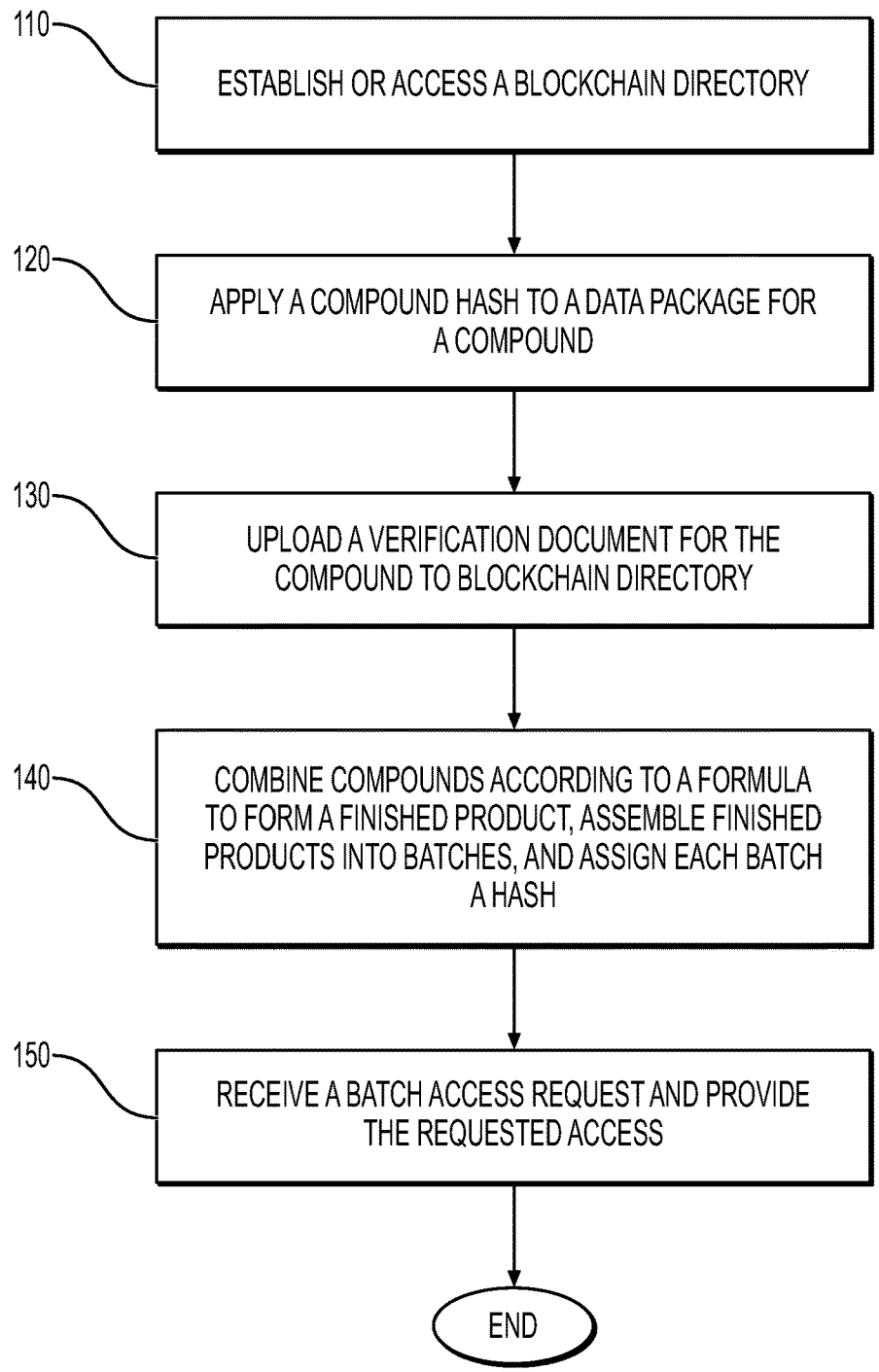
FIG. 1 is a flowchart illustrating an example method by which example tracking software is applied to compounds (e.g., pure products), the compounds are combined through the application of formulas to produce finished products, and finished products (i.e., the combined compounds (or, combined pure products) ultimately are linked to batches of finished products. In this example, compounds refer to pure products or byproducts that are purchased by manufacturers and combined by the manufacturers, using the formulas, to create the finished products. By linking each batch of finished products with the compounds the batch of finished products contains, verification data can be accessed for each batch of finished products created and distributed to consumers.

The following description will include references to example structures and methods. It is to be understood that there is no intention to limit the inventions to the specifically disclosed example structures and methods, but the inventions may be practiced using other features, elements, methods and structures. Thus, the examples are described to illustrate the present invention, not to limit its scope. Those of ordinary skill in the art will recognize a variety of equivalent variations on the description that follows.

Chemical analysis is easier with purer compounds. The example method (as implemented using the corresponding example system) includes tagging a compound with a compound hash that is correlated to a verification document. The verification document is stored externally and referenced by the hash. Compounds are generally combined into finished products according to formulas. Therefore, by verifying each compound in a formula, a finished product itself is wholly accounted for in each batch of finished products made. Batches of finished products are marked with a batch hash or batch identifier of their own, which in turn references each compound hash assigned to a compound incorporated into a finished product according to the formula. Each individual finished product within each batch bears the batch hash or batch identifier, allowing consumers to access the combined verification reports for each ingredient included in the finished product. Compound and batch data (i.e., data accessible through the compound hashes and the batch hashes) also are extremely valuable to manufacturers for assuring the quality of their products and yields valuable supply chain management insights.

One example system may be used for tracking the content of dietary supplements. Manufacturers use laboratory tests to verify the contents of their finished products and tie those tests to the underlying compounds using the directory associated hash marks. Those test results are assigned a hash within the directory which becomes associated with the verification report and then is combined with other compound verification reports according to the formula. A secondary (i.e., a batch) hash code or identifier is then placed on the completed batch of finished products to reference the combined reports. By accessing the hash code directly or some proxy thereof, such as a QR code identifier, merchants and consumers can access the verification reports and confirm the content of their supplements (i.e., finished products), not only for quantity but for purity as well. One example of the method includes gathering data about when data packages were accessed, by whom or in which geographical location. This provides valuable consumer information that can be used to more efficiently distribute safe products throughout the market.

Data gathered by this example system is tracked using blockchain technology, providing for the availability of valuable trend data. Not only will the manufacturers of unregulated products such as dietary supplements, vitamins, nutraceuticals, electronic cigarette liquids and *cannabis* oils be able to provide the public with assurances of the ingredients in their finished products, but they will be able to better track how their finished products move through the market each time the verification hash is accessed. Understanding supply trends helps manufacturers more efficiently and effectively serve their markets and helps them predict demands of consumers.

Another example system may be used for tracking the ingredients (i.e., constituent compounds) and quality of vaporizer liquids. Manufacturers purchase multiple verified compounds and combine the verified compounds in order to add active ingredients, suspension mediums, and flavoring. These verified compounds (i.e., finished products) are sold to shops and consumers in order to be used in vaporizer products. As the market for these oils and liquids is largely unregulated, consumers have a hard time finding products that do not contain dangerous chemical additives or impurities. By verifying each ingredient and providing reports on each compound contained in a batch of finished products, consumers can be put on guard to the presence of dangerous products and the market benefits from an increased amount of transparency. Educated consumers are more likely to direct their business towards safer products, which in turn drives the market for these safer products.

An additional example method may be used for tracking the ingredients present in food products. Prepared or prepackaged food products contain numerous ingredients that can be verified for safety according to the compounds the food products contain. Verification reports for these food products are combined according to recipe formulas to create batches or servings. Food products that contain several components can be tracked through a single place. This example system could also be used to account for overall quantization of substances like fats and sugars or measurements like calories. Trend data generated by or available through this example method has potential value in regards to the recall of contaminated food products. This example method could also be used to more efficiently ship food products to better mirror demand. This is especially valuable in regard to perishable foods and food products and has the potential to significantly reduce food waste.

Disclosed herein is an example system that includes a compound associated hash or data point which is tied to a verification document for a particular compound. This verification document contains a report or qualitative assessment of what is included in that particular compound. Compounds are combined according to formulas, and the formulas are used to tie a data packet or data package (i.e., the verification document) associated with each particular compound to a batch of finished products set for consumption. Each batch of finished products has its own batch identifier or batch hash. The batch identifiers (or batch hashes) are used to aggregate the data packages for the compounds used in a finished product and to present the aggregated data packages (that is, the aggregated verification documents for the compounds) to any party seeking to verify the ingredients (i.e., compounds) contained within the finished product.

FIG. 1 illustrates an example method for implementing a blockchain incorporated method to verify ingredients or compounds in formulaically-constructed finished agricultural products and byproducts (i.e., in finished products). In FIG. 1, example method 100 includes, in block 110, a processor of a suitably-configured computer system (see, e.g., FIG. 2) establishes a blockchain directory, or database, or accesses an existing blockchain directory that is intended to tie hashes assigned to data packages describing compounds to finished products and batches of finished products incorporating those compounds. In block 120, the processor applies a separate and unique compound hash (I.e., applies tracking software) to a data package for each of one or more compounds that may be used as constituents of a finished product, the finished product typically being, but not limited to, an agricultural product or agricultural byproduct. Thus, each compound hash is tied to a verification document (the compound data package) for a specific compound used as a constituent in the finished product. In block 130, the processor uploads the verification document(s) for each of the one or more compounds to the directory. In block 140, the processor combines the hashes assigned to the verification documents for each of the one or more compounds according to a formula for a finished product into a batch data package. Thus, a batch represents one or more finished products, and each of the represented finished products is formulaically combined from one or more of the compounds. The processor then assigns a batch hash to the batch of finished products. Optionally, each finished product may have an associated verification document and thus in block 140, each finished product may be assigned a corresponding finished product hash. In block 150, the processor receives an access request to access the batch data package and the corresponding compound data packages, and optionally the finished product data packages, and in response, provides the verification documents for the batch of finished products, for the finished products and the constituent compounds. In an aspect, the access request is initiated by a consumer, merchant, or other individual, and optionally, a non-human user, scanning a representation of the batch hash, which may be emplaced on the finished product, or on packaging used with the finished product. In a further aspect, the representation may be a QR code or similar scannable software tracking component. In a still further aspect, the scanning may be implemented through a hand-held scanner or a scanning application instantiated on a hand-held computing device. In response to the request, the processor provides the requested access. Following block 150, example method 100 ends.

Figure 2:
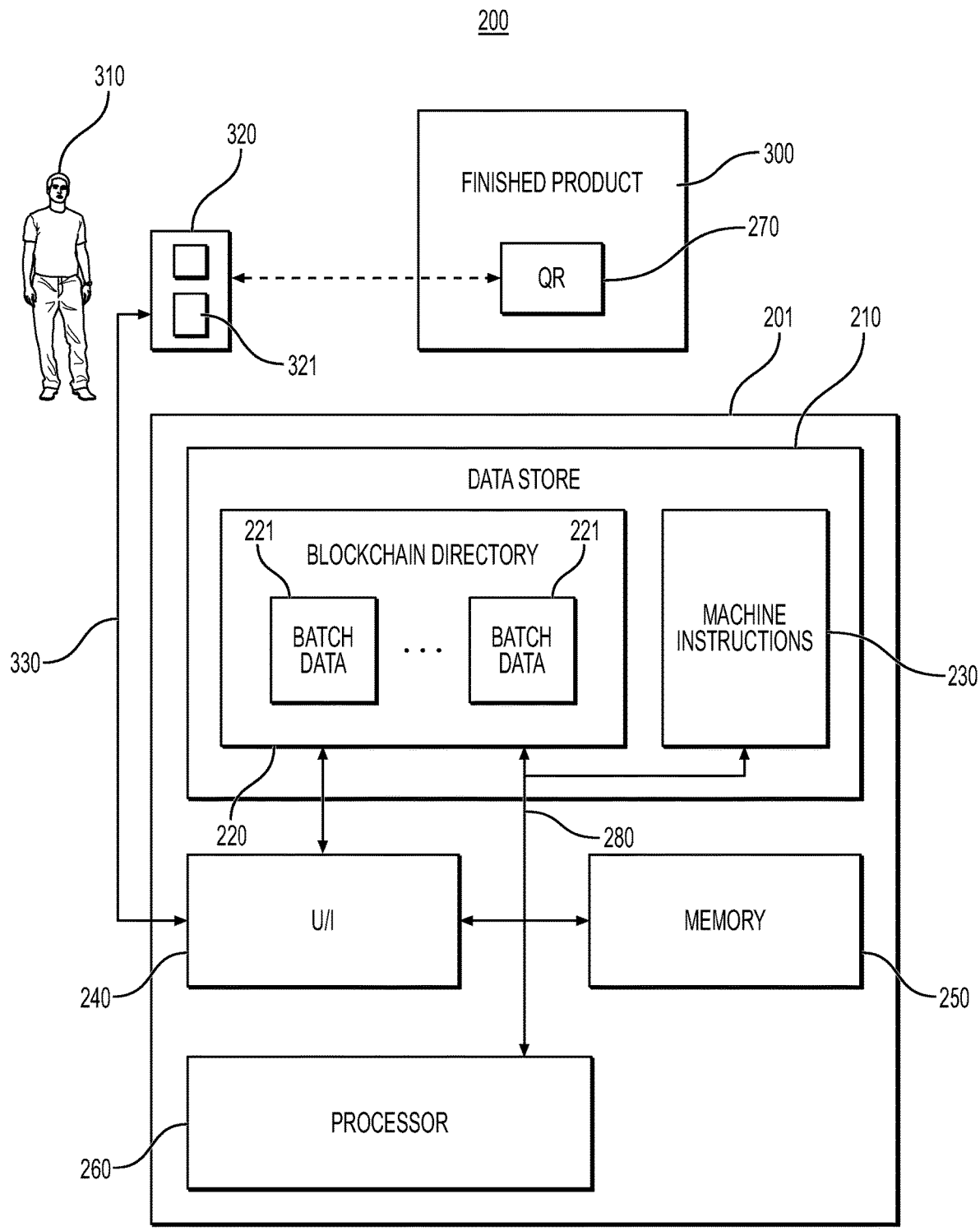
FIG. 2 illustrates components of an example computer-based system configured to implement a blockchain incorporated method for verifying ingredients in finished products that may be formulaically-constructed as agricultural products and byproducts, including the example method of FIG. 1.

FIG. 2 illustrates an environment and an example system that may be employed to implement the example method of FIG. 1, and similar methods. In FIG. 2, environment 200 includes computer-based system 201, food product 300 and user 310 (e.g., an end user, consumer, merchant, or other human) involved in the production, distribution, and consumption of food product 300. The user 310 is shown operating mobile computing device 320, which may be, for example, a smart phone, a dedicated scanner, or other mobile device. Although not illustrated in FIG. 2, scanning functions of the mobile computing device 320 may be implemented in a fixed, or non-mobile device. For example, the scanning functions may be provided by a fixed scanner, which may in turn operate in autonomous or semi-autonomous modes; in either mode, user 310 may control some aspects of operation of the fixed scanner. The mobile computing device 320, when implemented as a smart phone may include an optical/RF scanner application 321 that enables reading radio frequency identification (RFID) devices (i.e., a software device) such as QR code 270, which may be emplaced on packaging encapsulating food product 300, or directly on food product 300.

Computer-based system 201 includes data store 210, which is a non-transitory, computer-readable storage medium, user interface (U/I) 240, memory 250, and processor 260, all of which are coupled though communications and data bus 280. The U/I 240 provides, among other functions two-way access over communications and data path 330, which may be wired or (more typically) wireless to user 310 by way of mobile computing device 320 or other mobile or fixed devices, as disclosed herein. The data store 210 includes machine instructions 230, which may be loaded onto memory 250 by initial operation of processor 260, and subsequently executed by processor 260 to execute the example method of FIG. 1, and similar methods. The data store 210 further includes directly 220. Data stored within the directory 220 may be generated and located by operation of processor 260 executing machine instructions 230. In the example of FIG. 2, the directory 220 is shown storing multiple batch data packages 221. As disclose herein, batch data packages 221 link to compound data packages (not shown in FIG. 2), and allow access to verification documents associated with (1) each compound, (2) each finished product that is constituted from those compounds, and (3) each batch of finished products.

In an example operation of the computer-based system 201, a merchant may acquire or produce one or more compounds (not shown), assign, through operation of the system 201, each such compound a compound hash, which the system 201 then stores as a compound data package (not shown in FIG. 2), assemble the compounds into a finished product (e.g., the food product 300), assign food products (e.g., multiples of food product 300) to a finished product batch, and assign, through operation of the system 201, the batch a finished product batch hash. The system 201 may store the assigned finished product hash as at least a component of a batch data package 221. Thus, the batch data package 221 for food product 300 may include at least the food product 300 batch hash (implemented on food product 300 as QR code 270). Thus, the QR code 270 provides a link to the corresponding batch data package 221 for food product 300. Furthermore, the batch data package 221 links the QR code 270 to individual compound data packages. The results of these links means that user 310 is able, through scanning of QR code 270, to see verification documents attesting to the authenticity, origin, incorporation, quality, and quantity of each compound that constitutes food product 300, and to do so though one access point, namely the QR code 270.

Figure 3:
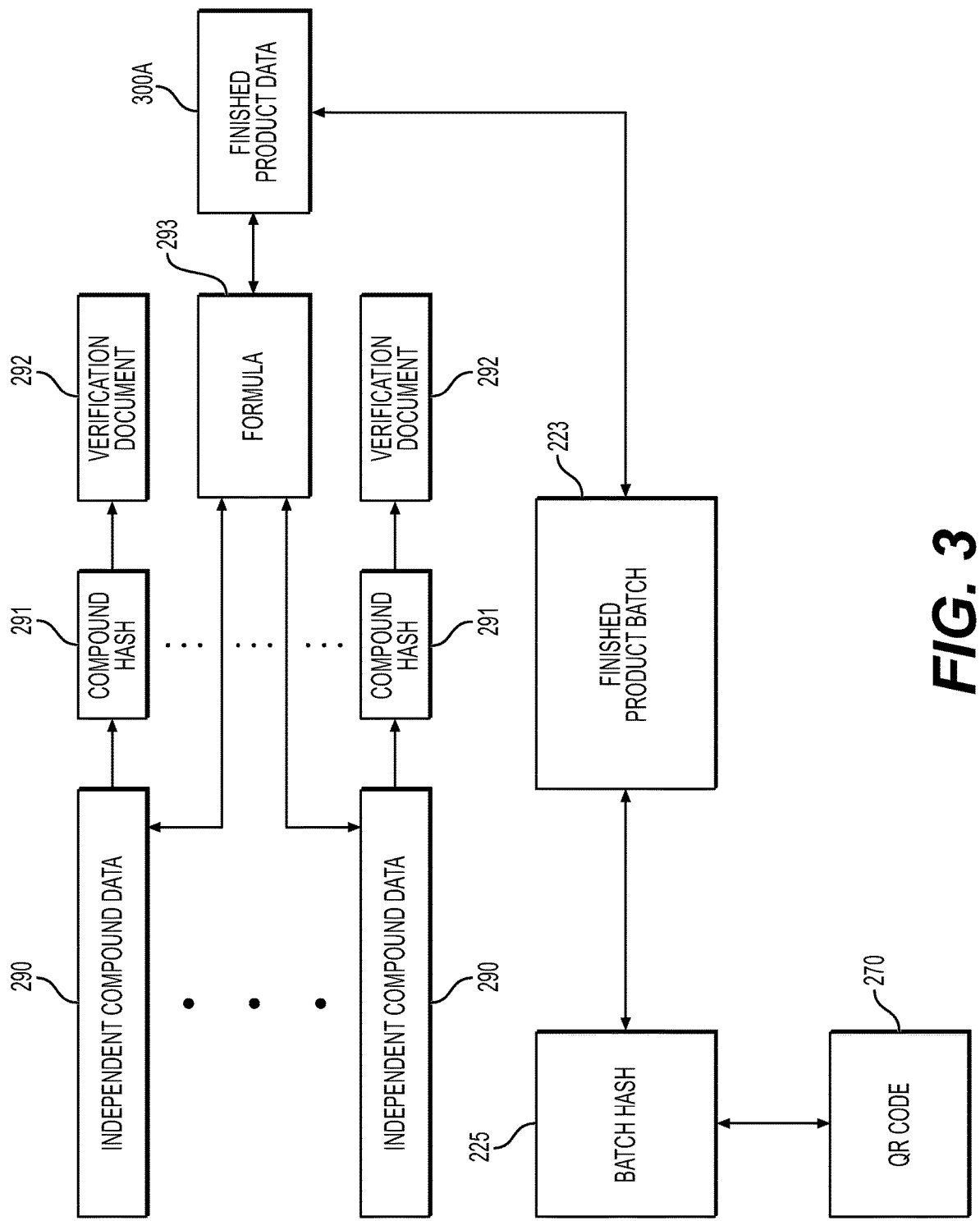
FIG. 3 illustrates an example finished product assemblage, and a corresponding finished product batch.

FIG. 3 illustrates an example finished product assemblage, and a corresponding finished product batch. As can be seen in FIG. 3, what actually is "assembled," for used by the computer-based system 201 of FIG. 2 are data that relate to individual, or independent compounds, data that relate to the food products into which the compounds are formed, and data related to batches of food products. In FIG. 3, independent compound data 290 for each independent compound are assigned, by operation of the computer-based system 201, a compound hash 291. The compound hash provided a link to a verification document 292 attesting to the independent compound. The independent compound data 290, the compound hash 291, and the verification document 292 may be stored in the directory 220 (see FIG. 2), and may be linked, as a single access point, through the batch hash 225. Formula 293 is used to produce, through operation of the computer-based system 201 of FIG. 2, a description of a finished product, such as the finished product 300 of FIG. 2. The description may be stored in the directory 220 as finished product data 300A, which also are linked through the batch hash 225. The finished product data 300A (for one finished product or multiple finished products) may be assembled through operation of the computer-based system 201 to provide a finished product batch 223. The finished product batch 223 is assigned, through operation of the computer-based system 201, a batch hash 225, which is shown linked to QR code 270 (also see FIG. 2). The finished product batch 223 includes finished product data and the finished product data and the batch hash may be stored in the directory 220 as batch data package 221. Thus, by scanning QR code 270, user 310 (see FIG. 2) may access, through a single point of entry, all data related to individual compounds, food products assembled through a specific formula, as well as the formula itself, and batches of food products.

The invention claimed is:

1. A computer implemented system comprising a processor that accesses a non-transitory, computer-readable storage medium having encoded thereon machine instructions executable by the processor for verifying a content and a quality of one or more compounds contained in finished products contained in finished product batches, the system further comprising:
   a blockchain directory used to generate hashes and store data packages for finished products and for compounds that are component compounds of the finished products, the blockchain directory comprising:
   a compound directory of component compounds linked to related compound data packages through compound hashes, wherein the processor executes the machine instructions to upload a document into the blockchain directory that corresponds to a nature of the compound, the nature of the compound comprising a purity and a quality of the compound,
   a library of formulas which incorporate specific types of compounds into specific types of the finished products and corresponding finished product batches, wherein application of a formula of the library of formulas enables tying an identifier for a finished product to data related to a purity and a quality of each individual compound used in the finished product, and
   a batch directory of finished product batches and corresponding batch data packages, a finished product batch assigned a finished product batch hash, the finished product batch hash tied through the application of the formula of the library of formulas to compound hashes for component compounds used, according to the formula of the library of formulas, as components of a finished product represented by the finished product batch hash; and a physical means of identifying the finished product batch hash, the identifying of the finished product batch hash invoking a single point of access into the blockchain directory, the single point of access providing a first link to a batch data package, and in turn providing second links to the compound data packages for the component compounds of the finished product, wherein the processor executes the machine instructions to verify the content and the quality of one or more compounds contained in finished products contained in finished product batches.

2. The system of claim 1, wherein a hash is assigned to an independent compound and relates the independent compound to a document provided by a party who verified components of the independent compound.

3. The system of claim 1, wherein a hash is assigned to an independent compound and relates the independent compound to a document provided by a party who is a source of the independent compound.

4. The system of claim 1, wherein the physical means comprises a scannable QR code.

5. The system of claim 1, where the physical means interacts with a mobile computing device capable of accessing the blockchain directory.

6. The system of claim 1, wherein batch hashes further include access to data related to batch quantity, location, and time of creation in addition to compound data.

7. A computer implemented method for certifying ingredients of batches of goods by identifying their source components comprising:
a computer processor establishing and using a blockchain directory to generate hashes and store data packages for finished products and for compounds that are component compounds of the finished products;
assigning each compound a compound hash;
uploading a document into the blockchain directory that corresponds to a nature of the compound, the nature of the compound comprising a purity and a quality of the compound;
combining compound hashes into batches according to a formula of a library of formulas, wherein the formula mirrors a combining of the compounds themselves into finished products and into corresponding batches of finished products, and wherein the formula enables tying an identifier for a finished product to data related to the purity and the quality of each individual compound used in a finished product;
assigning each batch a batch hash; and
using a single access point, the single point of access providing a first link to a batch data package, and in turn providing second links to the compound data packages for the component compounds of the finished product, accessing the batch hash which in turn accesses each of the data packages related to the compound hashes contained within that batch, wherein the processor verifies the content and the quality of one or more compounds contained in finished products contained in finished product batches.

8. The method of claim 7, wherein a data package provides an indication of a source of the compound to which the data package relates.

9. The method of claim 7, wherein formulas are applied in the blockchain directory as compounds are combined in a real world into new batches.

10. The method of claim 7, wherein accessing the batch hash comprises tying the batch hash to a scannable code in order to access data packages using a mobile computing device.

11. The method of claim 7, where batch hashes further provide access to batch data packages related to batch quantity and time of creation of finished products in addition to compound data packages.

12. A computer implemented system for verifying compounds constituting finished products contained in a batch of finished products, through access to data packages related to the compounds and the finished products, the data packages, the system comprising:
a blockchain directory used to generate hashes and store data packages for finished products and for compounds that are component compounds of the finished products; and
a processor in communication with a memory and a non-transitory computer-readable storage medium having encoded thereon machine instructions for verifying the compounds, wherein the processor executes the machine instructions to:
upload a document into the blockchain directory that corresponds to a nature of the compound, the nature of the compound comprising a purity and a quality of the compound;
assign compound hashes to individual compounds located in a real world, the compound hashes configured to access a compound data package;
use formulas to combine the individual compounds into finished products and to assign the finished products to batches, wherein a use of a formula enables tying an identifier for a finished product to data related to a purity and a quality of each individual compound used in the finished product;
assign batch hashes to batches in the real world, the batch hashes configured to access the compound hashes of the batch's individual compounds; and
use a single point of access, the single point of access providing a first link to a batch data package, and in turn providing second links to the compound data packages for the component compounds of the finished product, to access data packages associated with individual compound hashes in a batch when a batch's batch hash is accessed, wherein the processor verifies a content and quality of one or more compounds constituting finished products contained in the batch of finished products.

13. The system of claim 12, wherein a compound hash is assigned to an independent compound and relates the independent compound to a document provided by a party who verified components of the independent compound.

14. The system of claim 12, wherein a compound hash is assigned to an independent compound and relates the independent compound to a document provided by a party who is a source of the independent compound.

15. The system of claim 12, where batch hashes further provide access to data packages related to batch quantity, location, and time of creation of finished products in addition to compound data packages.

16. The system of claim 12, wherein the processor ties a batch hash to a scannable code in order to access batch and compound data packages via a mobile computing device configured to access the blockchain directory.

* * * * *